(12) United States Patent
Aupetitgendre et al.

(10) Patent No.: US 9,638,252 B2
(45) Date of Patent: May 2, 2017

(54) BEARING COMPRISING A RESILIENT BEARING FLANGE

(71) Applicants: Elie Aupetitgendre, Saint-Cyr-sur Loire (FR); Benoit Arnault, Saint-Cyr-sur-Loire (FR); Laurent Varnoux, Saint Avertin (FR)

(72) Inventors: Elie Aupetitgendre, Saint-Cyr-sur Loire (FR); Benoit Arnault, Saint-Cyr-sur-Loire (FR); Laurent Varnoux, Saint Avertin (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/144,970

(22) Filed: May 3, 2016

(65) Prior Publication Data

US 2016/0327096 A1 Nov. 10, 2016

(30) Foreign Application Priority Data

May 4, 2015 (FR) ..................... 15 53961

(51) Int. Cl.
*F16C 33/78* (2006.01)

(52) U.S. Cl.
CPC ........ *F16C 33/7823* (2013.01); *F16C 33/782* (2013.01); *F16C 33/783* (2013.01); *F16C 33/7859* (2013.01); *F16C 33/7863* (2013.01); *F16C 33/7896* (2013.01)

(58) Field of Classification Search
CPC .. F16C 33/7823; F16C 33/782; F16C 33/783; F16C 33/7859; F16C 33/7863; F16C 33/7896
See application file for complete search history.

(56) References Cited

U.S. PATENT DOCUMENTS

| 2,600,434 | A | | 6/1952 | Saywell | |
|---|---|---|---|---|---|
| 2,812,224 | A | * | 11/1957 | Richmond | F16C 23/084 384/477 |
| 6,966,558 | B2 | * | 11/2005 | Murakami | F16C 33/7859 277/549 |
| 8,585,296 | B2 | * | 11/2013 | Yamaguchi | F16C 33/7853 277/347 |
| 8,864,385 | B2 | * | 10/2014 | Varnoux | F16C 33/7859 384/478 |
| 2002/0015543 | A1 | * | 2/2002 | Pairone | F16C 33/785 384/477 |

(Continued)

FOREIGN PATENT DOCUMENTS

| DE | 1744644 U | 5/1957 |
|---|---|---|
| JP | 2009236161 A | 10/2009 |
| WO | 2010133240 A1 | 11/2010 |

*Primary Examiner* — Thomas R. Hannon
(74) *Attorney, Agent, or Firm* — Bryan Peckjian; SKF USA Inc. Patent Dept.

(57) ABSTRACT

The bearing provides an outer ring, an inner ring, at least one seal fixed to one of the rings and cooperating with the other ring, and at least one sealing flange fixed on the other ring. Flange is at least partly elastically deformable in the axial direction. Flange is axially mounted in contact against an outer lateral face of the seal. At least one local deformation is provided to the sealing flange to support elastically deformation of the flange. The sealing flange further provides at least one protrusion that axially extends beyond the local deformation.

10 Claims, 3 Drawing Sheets

(56) References Cited

U.S. PATENT DOCUMENTS

2016/0169286 A1\* 6/2016 Aupetitgendre .... F16C 33/7886
　　　　　　　　　　　　　　　　　　　384/489
2016/0169287 A1\* 6/2016 Aupetitgendre .... F16C 33/6607
　　　　　　　　　　　　　　　　　　　384/462

\* cited by examiner

BEARING COMPRISING A RESILIENT BEARING FLANGE

CROSS-REFERENCE TO RELATED APPLICATIONS

This application claims priority to French patent application no. 1553961 filed on May 4, 2015, the contents of which are fully incorporated herein by reference.

FIELD OF THE INVENTION

The present invention relates to the field of bearings, and particularly those used in automotive or industrial applications.

BACKGROUND OF THE INVENTION

In a bearing, one or more seals are typically used to maintain lubricant, such as grease, inside the bearing and to prevent the entry of contaminating particles. Typically, such seals are fixed on one of the bearing rings and cooperate with the other ring so as to form a dynamic sealing.

The patent application WO-A1-2010/133240 (SKF) discloses a rolling bearing comprising two seals fixed to the outer ring and each comprising an inner lip in frictional contact with the inner ring. The bearing further provides two sealing flanges fixed to the inner ring and against which an outer lip of the associated seal is sliding.

The use of such a flange axially on each side of the bearing and cooperating with the outer lip of the associated seal permit to limit the passage on contaminating particles to the inner lip of the seal in frictional contact with the inner ring. However, the contact pressure exerted by the elastomeric outer lip on the flange tends to decrease over time, and in case of relative angular tilting of the bearing rings. This may affect the sealing properties of the bearing in operation.

The present invention aims to overcome this disadvantage.

SUMMARY OF THE INVENTION

More particularly, the present invention aims to provide a bearing having an improved sealing.

The present invention further aims to provide a bearing easy to manufacture and to assemble.

The present invention also seeks to provide a bearing with at least one sealing flange that can be stored with a reduced risk of wear and deterioration of the flange.

In one embodiment, the bearing comprises an outer ring, an inner ring, at least one seal fixed to one of the rings and cooperating with the other ring, and at least one sealing flange fixed to the other ring. The sealing flange is at least partly elastically deformable in the axial direction. The sealing flange is axially in contact against an outer lateral face of the seal. At least one local deformation is provided on the sealing flange to support elastically deformation of the flange. The sealing flange further provides at least one protrusion that axially extends beyond the local deformation.

The elastically deformable nature of the sealing flange keeps the axial contact between the flange and the seal. More particularly during storage, the at least one protrusion provided on the flange avoids crushing or deformation of the at least one local deformation that improve the elastic characteristic of the flange. Indeed before assembly, the sealing flanges are typically stored against each other so as to obtain a stack. With the presence of one or more protrusions that axially extends beyond the one or more local deformations, the risk of damage of the one or more local deformations is reduced. Moreover, the risk of damage of the one or more local deformations of the flange is also reduced during storage of the bearing when assembled.

In one embodiment, the sealing flange provides a fixing portion for the fixation of the flange to the other ring. Preferably, the protrusion is provided on the fixing portion of the flange.

In one embodiment, the fixing portion of the sealing flange is axially bearing against a front surface of the other ring.

The sealing flange may further provide a connecting portion that connects the fixing portion and a support portion axially contacting against the outer lateral surface of the seal, at least the connecting portion being axially elastically deformable. The local deformation may be provided on the connecting portion of the flange. The connecting portion can inwardly extend towards the seal. In one embodiment, the connecting portion has a curved shape.

In one embodiment, the local deformation and the protrusion outwardly extend from the bearing. In another embodiment, the local deformation and the protrusion may inwardly extend in the bearing. In this case, it may be provided at least one groove to the front surface of the other ring in which the protrusion of the sealing flange can be arranged.

In one embodiment, the protrusion is made from a deformation of the flange material. Alternatively, the protrusion is made from a material added to the flange.

In one embodiment the protrusion of the sealing flange has an annular shape. Alternatively, the sealing flange may provide a plurality of protrusions that axially extend beyond the local deformation and that are circumferentially spaced.

Preferably, the sealing flange is axially deformed by axial contact with the seal.

The axial deformation and the elastic nature of the sealing flange maintain the axial contact between the flange and the seal over time. The sealing flange exerts a permanent axial preload to the seal in response to the elastic deformation of the flange. Good bearing sealing properties are maintained over time.

In one embodiment, the seal provides at least one sealing gasket. Preferably, the sealing gasket is made from a soft material and the support portion of sealing flange is made from a rigid material.

The support portion of the sealing flange may be in metal. The connecting portion of the flange may in soft material, in particular in a synthetic material or polymer material. Alternatively, the connecting portion is metallic, as an example in spring steel. Support portion, connecting portion and fixing portions may be made from the same material or from different materials.

The support portion of sealing flange may form an end portion of the flange. The support portion may have an axially convex shape towards the seal. Then the friction between the seal and the associated sealing flange is reduced. Moreover, any contact between a sharp edge of the flange end and the seal is prevented so as to avoid any deterioration of seal.

BRIEF DESCRIPTION OF THE DRAWINGS

The present invention will be better understood by the detailed description of embodiments as non-limiting examples of the invention and illustrated by the annexed figures, wherein.

DETAILED DESCRIPTION OF THE INVENTION

Figure 1:
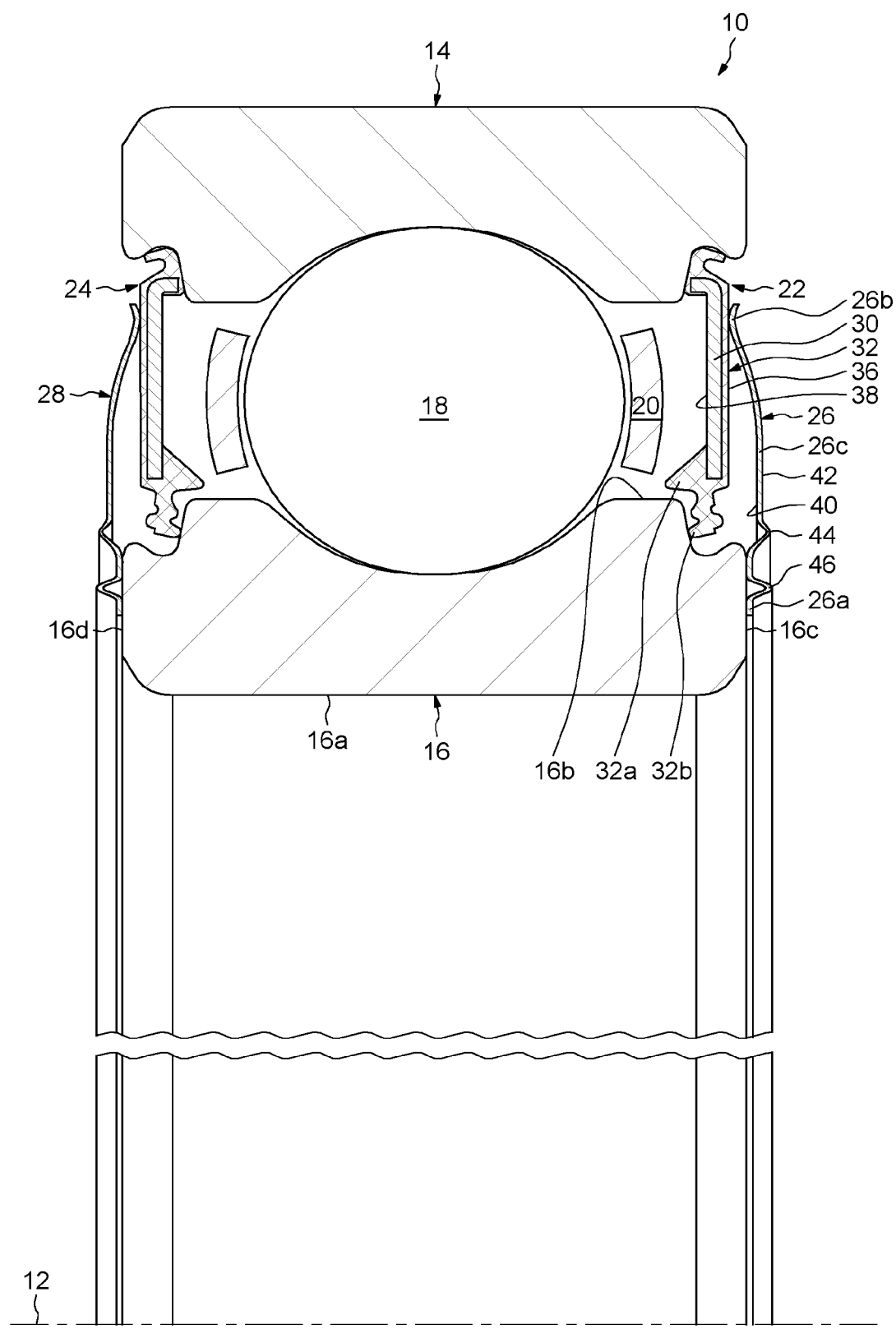
FIG. 1 is an axial sectional half-view of a bearing according to a first embodiment of the invention.

In FIG. 1, a rolling bearing 10, of axis 12, provides an outer ring 14, an inner ring 16, a plurality of rolling elements 18, here balls, radially arranged between rings and a cage 20 to maintain rolling elements as regularly circumferentially spaced.

The bearing 10 provides axially on each side an annular seal 22, 24 to close the radial space defined between the inner ring 16 and the outer ring 14. The bearing 10 further provides axially on each side an annular sealing flange 26, 28 that axially contacts the seal 22, 24 on the outer side of the bearing 10. In the illustrated embodiment, seal 22, 24 are fixed to the outer ring 14 and the sealing flanges are fixed to the inner ring 16.

The outer ring 14 provides an outer axial cylindrical surface, a cylindrical bore, two opposite front surfaces that axially delimit the bore and outer surface, and a raceway provided on bore and having an inner concave profile adapted for rolling elements 18, the raceway being radially inwardly directed. The outer ring 14 further provides two annular grooves provided on bore, the grooves radially outwardly extending and axially disposed on either side of the rolling elements 18. In FIG. 1, the different parts of the outer ring 14 are not referenced.

The inner ring provides a cylindrical bore 16a, an outer axial cylindrical surface 16b, two radially opposed front surfaces 16c, 16d that axially delimit the bore and outer surface, and a raceway provided on the outer surface 16b and having an inner concave profile adapted for rolling elements 18, the raceway being radially outwardly directed. Cage 20 is radially disposed in the radial space defined between the outer surface 16b of the inner ring 16 and the bore of the outer ring 14.

The inner ring 16 further provides two annular grooves, not referenced, provided on the outer surface 16b, radially inwardly extending and axially disposed on either side of the rolling elements 18. Each of the grooves of the inner ring is radially opposite to a corresponding groove of the outer ring.

Each seal 22, 24 is radially disposed between the outer ring 14 and the inner ring 16, and fixed to the outer ring 14 so as to be laterally disposed with respect to the rolling elements 18. Each seal 22, 24 is fixed in one of the grooves of the outer ring 14. Each seal 22, 24 is entirely fit in the radial space defined between the outer ring 14 and the inner ring 16. Each seal 22, 24 is axially offset to the inner side of the bearing with respect to the associated front surface of the outer ring.

In this embodiment, seals 22, 24 are identical and symmetrical with respect to the radial median plan of bearing 10. Both seals 22, 24 being identical, we will now describe only one of the two.

Seal 22 provides an annular rigid insert 30 and an annular soft seal gasket 32 fixed to the insert 30. Insert 30 is made of a rigid material, for example in metal or a thermoplastic material, notably polyamide. Insert 30 forms a stiffening insert for the seal gasket 32. Seal gasket 32 is overmoulded or vulcanized onto the insert 30. Seal gasket 32 is made of a soft material, for example an elastomer such as nitrile rubber or in thermoplastic elastomer.

Seal gasket 32 covers an outer surface of insert 30. Seal gasket 32 covers an outer lateral face of insert 30. Seal gasket 32 provides an annular outer lateral face 36 axially directed from the outer side of bearing 10 towards the associated sealing flange 26. The outer lateral face 36 is axially offset towards the inner side of bearing 10 with respect to the front surfaces of the inner ring 16 and the outer ring 14. The outer lateral face 36 of seal gasket 32 forms the outer lateral face of seal 22. The outer lateral face 36 is flat. The outer lateral face 36 radially extends. An inner lateral face 38 if axially opposed to the outer lateral face 36 and is axially directed towards the interior of bearing 10. The inner lateral face 38 is defined by insert 30 here.

Seal gasket 32 forms two sealing portions that are radially opposed and exerting a dynamic seal with the inner ring 14 and a static seal with the outer ring 16. More precisely, a "static seal" is the seal formed between two parts without relative movement, and a "dynamic seal" is the seal between two parts with relative movement.

The outer sealing portion of gasket 32 is force-fitted in the associated groove of the outer ring 14 so as to fix the seal 22 in the ring 14. Only the gasket 32 is in contact with the outer ring 14. A good holding in position of the seal 22 is enabled by a mounting with force-fitting and friction. In the illustrated embodiment, the inner sealing portion of gasket 32 provides a first lip 32a and a second lip 32b. Lips 32a, 32b are annular and concentric, and axially extend towards the interior of bearing 10. The lip 32b contacts a radial wall of the groove of inner ring 16. The inner lip 32a has a diameter greater than the lip 32b and radially surrounds the outer surface 16b of the inner ring 16 so as to form a narrow passage of labyrinth type with the outer surface.

Each sealing flange 26, 28 is axially offset relative to the associated seal 22, 24 to the outer side of bearing 10. Each sealing flange 26, 28 is axially bearing against one of the frontal surfaces 16c, 16d of the inner ring 16 and bears against the seal gasket 32 of the associated seal 22, 24. Sealing flanges 26, 28 are symmetrical with each other relative to a transversal radial plan passing through the center of bearing 10. Both sealing flanges 26, 28 being identical, we will now describe only one of the two.

Sealing flange 26 is fixed to the inner ring 16 and axially extends towards the outer ring 14. Sealing flange 26 is fixed to the inner ring 16 by any appropriate means, such as gluing or welding. Sealing flange 26 is axially mounted in contact with the front surface 16c of the inner ring 16. Sealing flange 26 is fixed on the front surface 16c. In the illustrated embodiment, sealing flange 26 is mounted in direct contact against the inner ring 16. Alternatively, an intermediate element could be interposed axially between the inner ring 16 and the flange 26.

Sealing flange 26 is axially in contact against the outer lateral surface 36 of seal 22. Flange 26 provides an inner lateral face 40 that is axially oriented to the seal 22 and that contact against the seal 22, and an outer lateral face 42 that is axially oriented towards the exterior of bearing 10. The inner lateral face 40 and the outer lateral face 42 axially define the thickness of flange 26. In the illustrated embodiment, flange 26 is mounted axially in direct contact with seal 22.

Flange 26 provides an annular fixing portion 26a mounted axially in contact against the front surface 16c of the inner ring 16, and a support portion 26b against the seal 22. Support portion 26b is annular and is in axial contact with the outer lateral face of the seal 22. In the illustrated embodiment, the fixing portion 26a of flange 26 has a purely radial shape. Fixing portion 26a forms an inner portion of the flange 26. Support portion 26b forms an outer or end portion of the flange 26. In the illustrated embodiment, support portion 26b has a curved shape that is axially concave on the exterior side, and convex on the inner side. Support portion 26b is axially mounted in contact against the seal gasket 32 of seal 22. Only the support portion 26b of flange 26 is mounted in contact against seal 22.

Flange 26 also provides an annular connecting portion 26c that extends between the fixing portion 26a and the support 26b by being connected to the portions. Connecting portion 26c radially extends the fixing portion 26a and is radially extended by the support portion 26b. Connecting portion 26c is formed so as to be flexible and elastically deformable in the axial direction. Connecting portion 26c inwardly extends towards the seal 22. In the illustrated embodiment, connecting portion 26c has a shape that is axially curved towards the interior of bearing 10.

A corrugation 44 is provided on the connecting portion 26c so as to promote the flexibility and the elastic deformation in the axial direction of the portion, hence flange 26. Corrugation 44 is distinct from the support portion 26b of flange 26. In the illustrated embodiment, the flange 26 is elastically deformable thanks to the shape of the connecting portion 26c, the thickness of this portion and the presence of the corrugation 44.

Corrugation 44 forms a local deformation of material in projection from the lateral face 42. Corrugation 44 axially projects relative to the rest of the lateral face 42. Corrugation 44 has here a general annular shape. Corrugation 44 extends towards the exterior of bearing 10, i.e. to the side opposite to seal 22. Corrugation 44 extends axially. In the illustrated embodiment, corrugation 44 extends from the edge of larger diameter of the fixing portion 26a of flange 26. Flange 26 provides here a single corrugation 44. Alternatively, flange 26 may provide a plurality of successive corrugations in the radial direction. As another embodiment, it could be possible to provide one or more local deformations of other shapes than corrugation 44 and also enabling the elastic deformation of flange 26.

Flange 26 is axially deformed towards the exterior of bearing 10 by the axial contact between the support portion 26b and the seal 22. Connecting portion 26c of flange 26 is axially deformed towards the exterior by the axial contact. Connecting portion 26c is deformed against its own elasticity. Flange 26 is axially preloaded by the contact with seal 22. In the preloaded state, the axial distance between the fixing portion 26a and the support 26b on the side of inner lateral face 40 is less than the axial distance between the portions in the free state of flange or unsolicited.

The connecting portion 26c of flange 26 tends to return to its unloaded or axially unsolicited position, by elasticity. The support portion 26b of flange 26 exerts a permanent axial load on seal 22. Good sealing properties are maintained over time thanks to the continuous sliding axial contact between the support portion 26b of flange 26 and the seal 22. Indeed, the arrival of contaminating particles is limited between the support portion 26b and seal 22. The arrival of the contaminating particles is limited until the dynamic sealing portion of seal 22 that cooperate with the inner ring 16.

Figure 2:
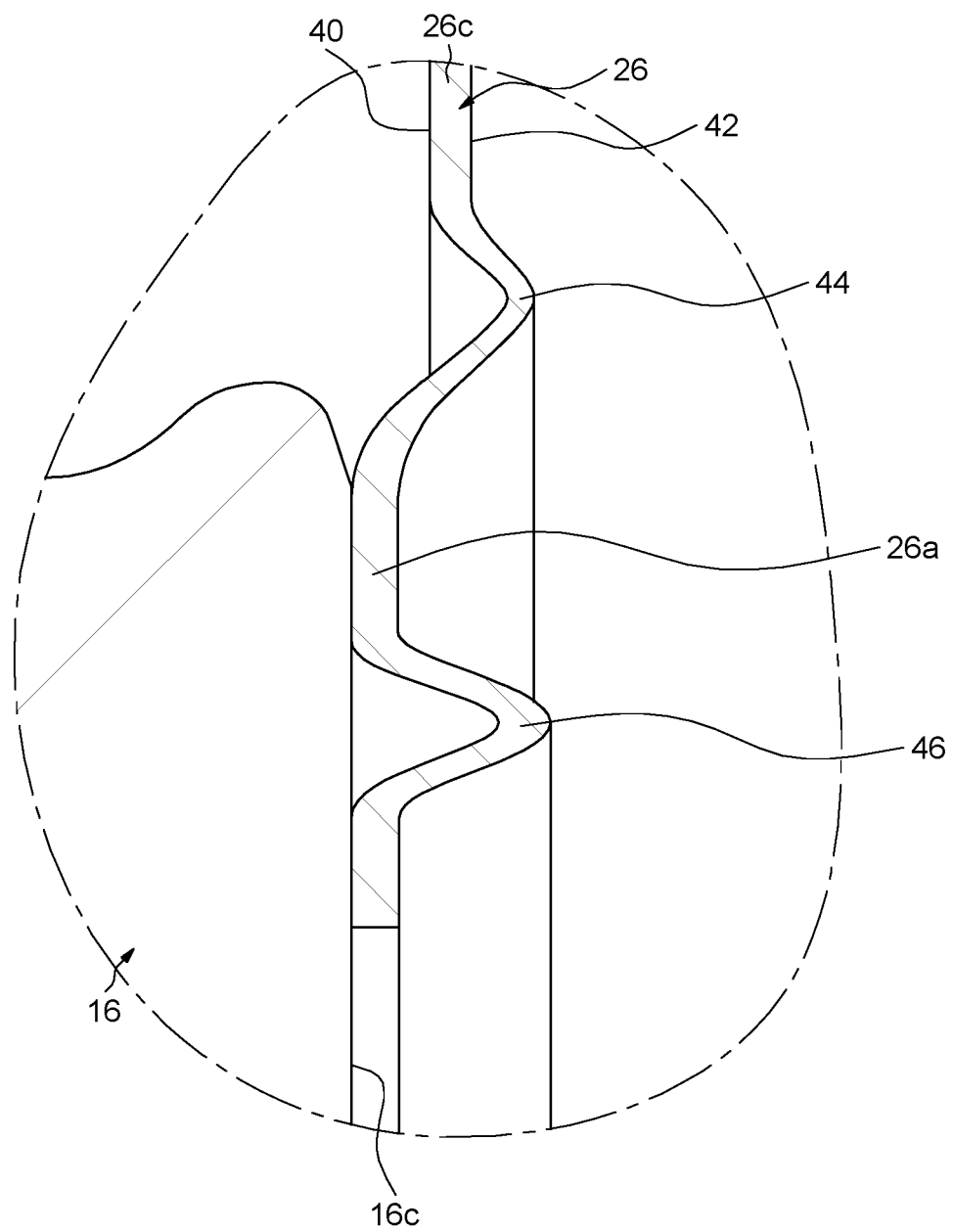
FIG. 2 is a detailed view of a sealing flange of bearing of FIG. 1.

Flange 26 further provides a protrusion 46 that extends towards the exterior of bearing 10 and axially beyond corrugation 44. Protrusion 46 extends axially here. In the illustrated embodiment, protrusion 46 is provided in the fixing portion 26a of flange 26. Protrusion 46 projects from the fixing portion 26a. Protrusion 46 axially extends beyond the rest of the lateral face 42, and in particular beyond the corrugation 44. Protrusion 46 has a shape axially concave on the interior side and axially convex on the inner side of bearing 10. As more clearly illustrated in FIG. 2, the free extremity of protrusion 46 is axially offset towards the exterior relative to the free extremity of corrugation 44.

Protrusion 46 prevents crushing of corrugation 44, for example during storage of flange 26 or storage of assembled bearing 10. Indeed, protrusion 46 forms a protruding obstacle upstream of corrugation 44 and limits the risk of deformation of the corrugation 44 by contact with the external element. The elastic deformation properties of flange 26 are thus maintained.

Figure 3:
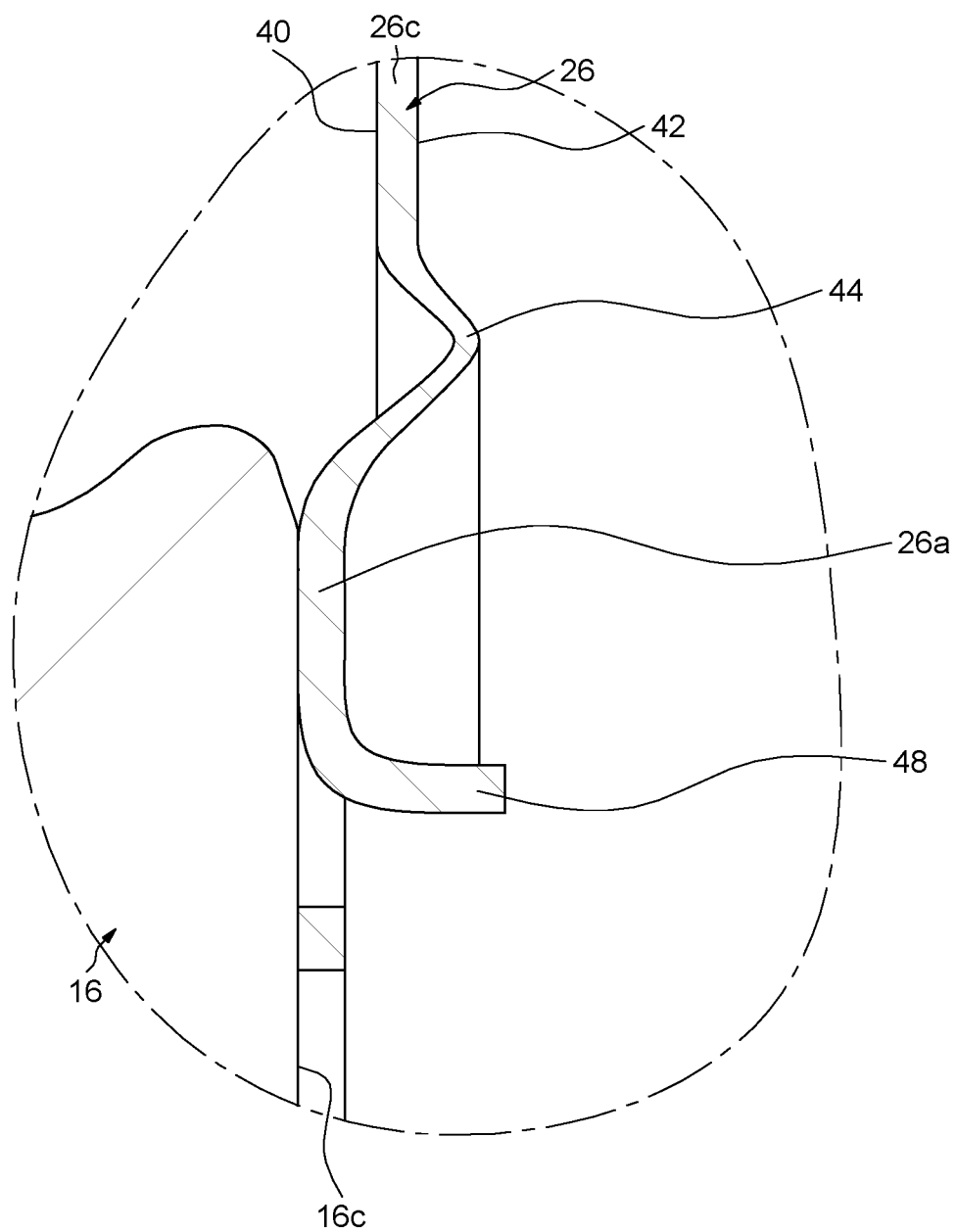
FIG. 3 is a detailed view of a sealing flange of a bearing according to a second embodiment of the invention.

In the illustrated embodiment, protrusion 46 has an annular shape. Alternatively, flange 26 may provide a plurality of protrusions 48 formed on the fixing portion 26a and circumferentially spaced, as illustrated in the embodiment of FIG. 3 in which the same elements have the same references. Similarly, each of the protrusions 48 axially extends beyond corrugation 44.

In each of these embodiments, corrugation 44 and protrusions 46, 48 are integral, i.e. forming one-piece with flange 26. Flange 26 is made in one piece. Flange 26 is made of a rigid material, for example in metal and advantageously made from a cut and stamped flank of metal sheet. In this case, corrugation 44 and protrusions 46, 48 are advantageously formed during stamping operations. Alternatively, flange 26 may be made of another rigid material, for example a synthetic material such as polyamide. One or more protrusions may also be assembled and fixed to flange 26 by any appropriate means, for example by gluing or overmoulding. In this case, the one or more protrusions may be made of a soft material, such as elastomer, nitrile rubber or thermoplastic elastomer.

In the illustrated embodiment, each sealing flange is fixed to one of the front surface of the inner ring. Alternatively, each flange could be fixed in an annular groove provided in the bore of the inner ring, for example by crimping. In this case, the fixing portion of flange may have an L-shape comprising a radial portion in contact against a radial surface of the inner ring and a bent portion fit in the groove. The one or more protrusions may be provided on the radial portion of fixing portion.

In the illustrated embodiments, each seal provides two parts, i.e. a stiffening insert and a seal gasket fixed to the insert and provided with at least one sliding lip cooperating with the inner ring. Alternatively, seal gasket may provide only one or more lips of labyrinth type that cooperates with the inner ring. Alternatively, seal may provide only one part, i.e. the insert or the seal gasket.

In the illustrated embodiments, sealing flange is fixed to the inner ring and seal is fixed to the outer ring. Alternatively, the arrangement could by reversed with the seal fixed to the inner ring and the sealing flange fixed to the outer ring.

The invention is illustrated with a rolling bearing comprising at least one row of rolling elements arranged between bearing rings. Alternatively, the bearing may be a sliding bearing comprising two races or rings in direct sliding contact.

The invention claimed is:
1. A bearing comprising:
   an inner ring,
   an outer ring,
   at least one seal fixed to one of the rings and cooperating with the other ring, and
   at least one sealing flange fixed on the other ring, wherein the sealing flange is at least partly elastically deformable in the axial direction and is axially mounted in contact against a lateral face of the seal, at least one local deformation is provided on the sealing flange to support elastically deformation of the flange, the flange further comprising at least one protrusion that axially extends beyond the local deformation.

2. The bearing according to claim 1, wherein the sealing flange further comprises a fixing portion for joining of the flange to the other ring.

3. The bearing according to claim 2, wherein the protrusion is provided on the fixing portion of the sealing flange.

4. The bearing according to claim 2, wherein the fixing portion of the sealing flange is axially mounted in contact against a front surface of the other ring.

5. The bearing according to claim 2, wherein the sealing flange further comprises a connecting portion connecting the fixing portion and a support portion axially mounted axially in contact with an outer lateral face of seal, the connecting portion being at least elastically deformable in the axial direction.

6. The bearing according to the claim 5, wherein the local deformation is provided on the connecting portion of the sealing flange.

7. The bearing according to claim 1, wherein the local deformation and the protrusion extend towards the exterior of bearing.

8. The bearing according to claim 1, wherein the protrusion is integral with the sealing flange.

9. The bearing according to claim 1, wherein the protrusion has an annular shape.

10. The bearing according to claim 1, wherein the sealing flange is axially deformed by the axial contact with the seal.

* * * * *